(12) United States Patent
Carbune et al.

(10) Patent No.: US 12,117,308 B2
(45) Date of Patent: Oct. 15, 2024

(54) NAVIGATION DIRECTIONS PREVIEW (71) Applicant: GOOGLE LLC, Mountain View, CA (US)

(72) Inventors: Victor Carbune, Zurich (CH); Matthew Sharifi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/057,074

(22) PCT Filed: Aug. 18, 2020

(86) PCT No.: PCT/US2020/046746
§ 371 (c)(1),
(2) Date: Nov. 19, 2020

(87) PCT Pub. No.: WO2022/039718
PCT Pub. Date: Feb. 24, 2022

(65) Prior Publication Data
US 2023/0168101 A1 Jun. 1, 2023

(51) Int. Cl.
G01C 21/36 (2006.01)
(52) U.S. Cl.
CPC ..... *G01C 21/3647* (2013.01); *G01C 21/3629* (2013.01); *G01C 21/3641* (2013.01)
(58) Field of Classification Search
CPC ............ G01C 21/3647; G01C 21/3629; G01C 21/3641
See application file for complete search history.

(56) References Cited

U.S. PATENT DOCUMENTS

| 7,920,968 B2 | 4/2011 | Chapin et al. |
| 8,442,768 B2 | 5/2013 | Sasaki |

(Continued)

FOREIGN PATENT DOCUMENTS

| EP | 2 843 368 A2 | 3/2015 |
| EP | 3 584 538 A1 | 12/2019 |

(Continued)

OTHER PUBLICATIONS

International Search Report and Written Opinion for Application No. PCT/US2020/046746, dated Apr. 19, 2021.

(Continued)

*Primary Examiner* — Abby Y Lin
*Assistant Examiner* — Danielle M Jackson
(74) *Attorney, Agent, or Firm* — MARSHALL, GERSTEIN & BORUN LLP (57) ABSTRACT To present a navigation directions preview, a server device receives a request for navigation directions from a starting location to a destination location and generates a set of navigation directions in response to the request. The set of navigation directions includes a set of route segments for traversing from the starting location to the destination location. The server device selects a subset of the route segments based on characteristics of each route segment in the set of route segments. For each selected route segment, the server device provides a preview of the route segment to be displayed on a client device. The preview of the route segment includes panoramic street level imagery depicting the route segment.

18 Claims, 7 Drawing Sheets

(56) References Cited

U.S. PATENT DOCUMENTS

| | | | |
|---|---|---|---|
| 8,635,557 | B2 | 1/2014 | Geise et al. |
| 8,700,300 | B2 | 4/2014 | LeBeau et al. |
| 8,788,203 | B2 | 7/2014 | Su et al. |
| 8,792,676 | B1 | 7/2014 | Jing et al. |
| 9,135,751 | B2 | 9/2015 | Moore et al. |
| 9,377,320 | B2 | 6/2016 | Sheridan et al. |
| 9,494,432 | B2 | 11/2016 | Pakzad et al. |
| 9,500,492 | B2 | 11/2016 | Moore et al. |
| 9,554,241 | B2 | 1/2017 | Foster |
| 9,689,698 | B2 | 6/2017 | Wesselius et al. |
| 10,462,276 | B2 | 10/2019 | Pelly et al. |
| 2007/0150188 | A1* | 6/2007 | Rosenberg ......... G01C 21/3647 701/431 |
| 2009/0281726 | A1* | 11/2009 | Byrne ................ G01C 21/34 701/533 |
| 2012/0158283 | A1* | 6/2012 | Arastafar ........... G01C 21/3641 701/410 |
| 2013/0006525 | A1* | 1/2013 | Stroila ............... G01C 21/20 701/434 |
| 2014/0362195 | A1 | 12/2014 | Ng-Thow-Hing et al. |
| 2015/0066368 | A1* | 3/2015 | McKenzie ......... G01C 21/3626 701/538 |
| 2015/0192426 | A1 | 7/2015 | Foster et al. |
| 2015/0233722 | A1 | 8/2015 | Faaborg et al. |
| 2016/0003623 | A1 | 1/2016 | Venkatraman et al. |
| 2016/0202082 | A1* | 7/2016 | Vandanapu ........ G01C 21/3697 701/400 |
| 2017/0067750 | A1* | 3/2017 | Day ................. G08G 1/096716 |
| 2017/0215031 | A1 | 7/2017 | Harding et al. |
| 2018/0073885 | A1* | 3/2018 | Sheridan ............ G01C 21/3602 |
| 2018/0094943 | A1* | 4/2018 | Grochocki, Jr. ... G01C 21/3492 |
| 2018/0245937 | A1* | 8/2018 | Moore ............... G01C 21/3415 |
| 2019/0376798 | A1* | 12/2019 | Abramson ......... G01C 21/3641 |

FOREIGN PATENT DOCUMENTS

| | | |
|---|---|---|
| JP | 2005-233631 A | 9/2005 |
| JP | 2006-017739 A | 1/2006 |
| JP | 2012-107879 A | 6/2012 |
| JP | 2015-219055 A | 12/2015 |
| WO | WO-2013/184447 A2 | 12/2013 |

OTHER PUBLICATIONS

Tripgeo.com, "Directions Map (with Animated Street View," (2007-2021). Retreived from the Internet at: URL:///<http://tripgeo.com/>.

International Search Report and Written Opinion for Application No. PCT/US2020/050353, dated Jun. 11, 2021.

Japanese Patent Application No. 2023-509565, Notice of Reasons for Rejection, mailing date of May 27, 2024.

* cited by examiner

FIG. 1

| Instruction | Waypoint Location | Maneuver Type | Maneuver Complexity Level | POI(s) at Waypoint | Traffic Signal at Waypoint? | Distance from Previous Waypoint | User Familiarity Metric (1-100) | User Compatability Metric (1-100) | Previous User Interaction Metric | Total Score (1-10) |
|---|---|---|---|---|---|---|---|---|---|---|
| Turn Right on Main Street | Corner of Main and Elm | Right Turn | Medium | Joe's Coffee | | 1 mile | 55 | 100 | 100 | 4 |
| Turn Left on State Street | Corner of State and Main | Left Turn | High | | Yes | 500 feet | 30 | 70 | 100 | 9.5 |
| Turn Left on North Street | Corner of North and State | Left Turn | Low | Donut Shop | Yes | 2 miles | 86 | 100 | 100 | 2 |
| Turn Right on Oak Street | Corner of Oak and North | Right Turn | Medium | | | 0.5 mile | 20 | 75 | 50 | 8 |

200

210 Maneuver Characteristics

220 User Characteristics

NAVIGATION DIRECTIONS PREVIEW

FIELD OF THE DISCLOSURE

The present disclosure relates to navigation previews and, more particularly, to selecting a subset of route segments within a set of navigation directions to include in a navigation preview and presenting panoramic street level imagery for the selected route segments.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request map and navigation data for various geographic locations. Software applications executing in computers, smartphones, embedded devices, etc., generate step-by-step navigation directions in response to receiving input from a user, specifying the starting point and the destination. The navigation directions are typically generated for a route which guides the user to the destination in the shortest amount of time.

SUMMARY

To provide a preview of navigation directions for traversing a route from a starting location to a destination location, a navigation preview generation system selects a subset of route segments to include in the navigation preview, where each route segment corresponds to a navigation instruction in a set of navigation directions. The navigation preview generation system may select the subset of route segments based on characteristics of the route segments, such as a type of maneuver for the route segment, a distance and/or time between the maneuver and the previous maneuver, a complexity level for the maneuver, the location of the route segment, the amount of traffic on the route segment, etc. The navigation preview generation system may also select the subset of route segments based on characteristics of the user requesting the navigation directions, such as the user's familiarity with the route segment, previous interactions by the user with navigation previews, etc. However, some embodiments relate to selections of a subset of route segments based on characteristics that are agnostic of the user requesting the navigation.

In general, providing a preview of navigation instructions/directions provides a technical effect of assisting a user in performing the technical task of navigation. As described herein, the preview can provide a user with information relating to specific route segments, that may involve maneuvers or that have other characteristics. This enables a user to become more familiar with a route, and to become aware of potential hazards or other points along the route, before navigating that route. This directly assists the user in performing the navigation and can enable the user to navigate more safely.

In some implementations, the navigation preview generation system scores each of the route segments based on the characteristics of the route segment, user characteristics, or any other suitable characteristics. Then the navigation preview generation system selects a subset of the route segments which are scored above a threshold score. Additionally or alternatively, the navigation preview generation system may rank the route segments based on their respective scores. Then the navigation preview generation system selects a subset of the route segments which are ranked above a threshold ranking.

In any event, the navigation preview generation system generates a navigation preview which includes each of the route segments in the selected subset. For each route segment in the selected subset, the navigation preview may include a display of panoramic street level imagery of the area corresponding to the route segment. In some implementations, the navigation preview may include a video display for the route segment which includes video frames depicting panoramic street level imagery for geographic areas leading up to, at, and subsequent to the waypoint location for the maneuver for the route segment. Panoramic imagery or video displays depicting the panoramic imagery are particularly advantageous in achieving a technical effect of assisting a user in performing a navigation. This is because the user is provided with visual information depicting the route, and so the user has access to a greater variety of information regarding a route segment, rather than just navigation instructions. In this way, a user is provided with additional information as assistance in performing navigation.

In addition to the panoramic street level imagery, the navigation preview may include audio, such as a description of the maneuver for the route segment. A maneuver for a route segment may be considered to a vehicle maneuver, or in other words a maneuver carried out by a vehicle at the route segment. In other implementations, the maneuver may be carried out by the user, such as when the user is walking. The audio for the navigation preview may be different from an audio navigation instruction provided during navigation. For example, the audio for the navigation preview may be more detailed than the audio navigation instruction provided during navigation. The audio during the preview may also provide additional context from the audio provided during navigation. More specifically, the audio for the navigation preview may include a description of the maneuver, a description of points of interest (POIs) or other landmarks which may help guide the user when performing the maneuver, a description of traffic signals which may help guide the user when performing the maneuver, etc. In this manner, the user may view the navigation preview and listen to the audio describing maneuvers on the route to prepare for the upcoming maneuvers and know what to expect on the route. The user can then review certain route segments where the user expects to have difficulty and can see a real-world representation of the area before performing a maneuver. In other words, the user is provided with additional information in the form of audio information that can assist the user in performing the navigation. The additional audio information is provided ahead of time (as part of the navigation preview), which avoids the risk of distracting the user with such information if the information was provided during navigation. Such additional information may be too distracting to a user if it was provided for the first time during navigation, and so providing the information as a preview to the navigation reduces a risk of distracting the user and therefore enables safer navigation.

In particular, a first aspect of the techniques of the present disclosure is a method for providing a navigation directions preview. The method includes receiving a request for navigation directions from a starting location to a destination location, and generating a set of navigation directions in response to the request, the set of navigation directions including a set of route segments for traversing from the starting location to the destination location. The method further includes selecting a subset of the route segments based on characteristics of each route segment in the set of route segments. For each selected route segment, the method includes providing a preview of the route segment to be displayed on a client device, the preview of the route segment including panoramic street level imagery depicting the route segment.

A second aspect of these techniques is a computing device for providing a navigation directions preview. The computing device includes one or more processors and a computer-readable memory coupled to the one or more processors and storing instructions thereon. The computer-readable memory may be non-transitory. When executed by the one or more processors, the instructions cause the computing device to receive a request for navigation directions from a starting location to a destination location, and generate a set of navigation directions in response to the request, the set of navigation directions including a set of route segments for traversing from the starting location to the destination location. The instructions further cause the computing device to select a subset of the route segments based on characteristics of each route segment in the set of route segments. For each selected route segment, the instructions cause the computing device to provide a preview of the route segment to be displayed on a client device, the preview of the route segment including panoramic street level imagery depicting the route segment.

A third aspect of these techniques is a method for providing a navigation directions preview. The method includes receiving a request for navigation directions from a starting location to a destination location, and obtaining a set of navigation directions in response to the request, the set of navigation directions including a set of route segments for traversing from the starting location to the destination location. For each of at least a subset of the route segments, the method includes providing a preview of the route segment including panoramic street level imagery depicting an area corresponding to a maneuver associated with the route segment.

A fourth aspect of these techniques is a computing device for providing a navigation directions preview. The computing device includes one or more processors and a computer-readable memory coupled to the one or more processors and storing instructions thereon. The computer-readable memory may be non-transitory. When executed by the one or more processors, the instructions cause the computing device to receive a request for navigation directions from a starting location to a destination location, and obtain a set of navigation directions in response to the request, the set of navigation directions including a set of route segments for traversing from the starting location to the destination location. For each of at least a subset of the route segments, the instructions cause the computing device to provide a preview of the route segment including panoramic street level imagery depicting an area corresponding to a maneuver associated with the route segment.

A fifth aspect of these techniques is a computer-readable memory storing instructions that, when executed by one or more processors, cause the one or more processors to carry out any of the methods described above.

DETAILED DESCRIPTION

Example Hardware and Software Components

Figure 1:
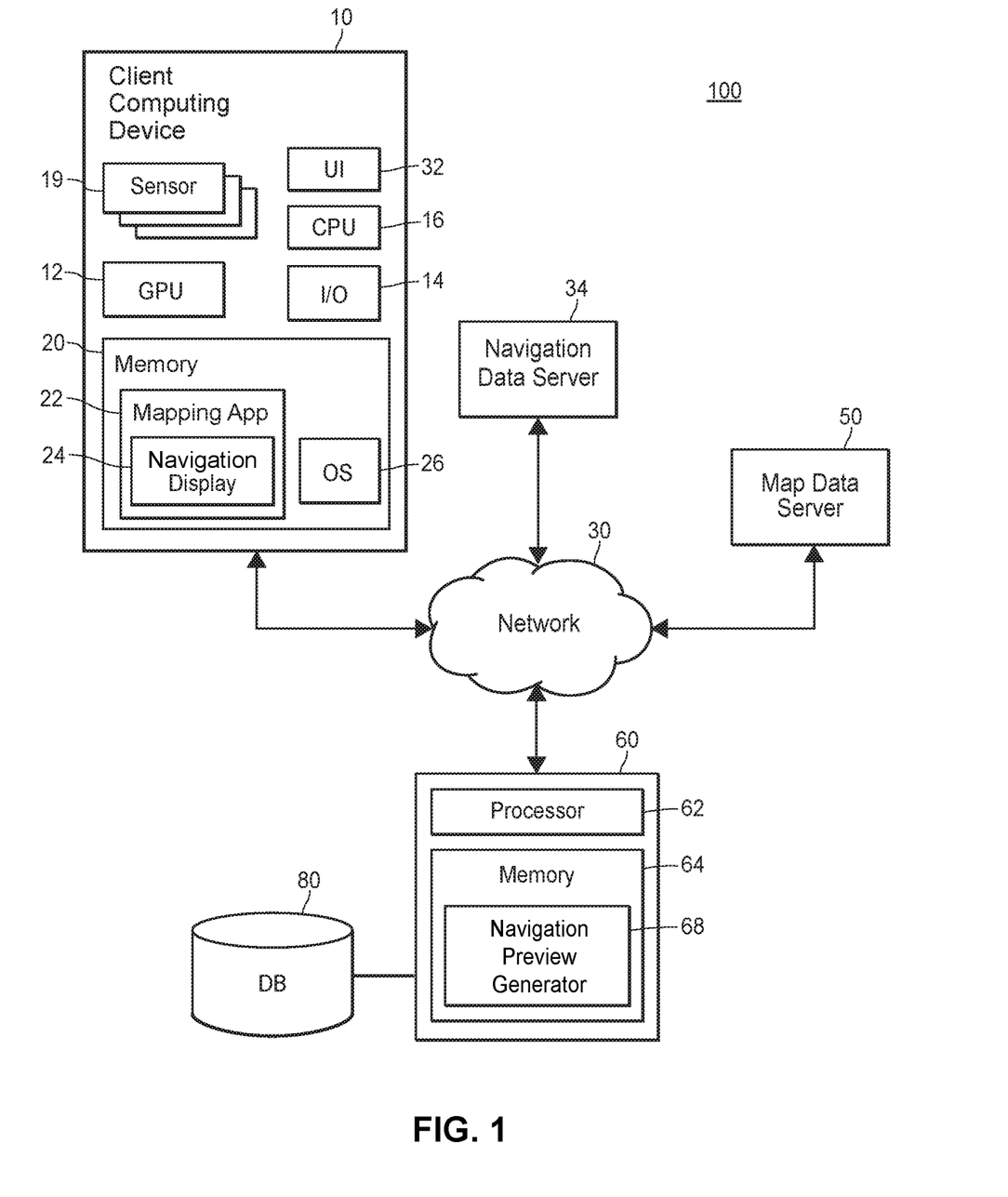
FIG. 1 illustrates a block diagram of an example communication system in which techniques for generating a navigation preview can be implemented.

Referring to FIG. 1, an example communication system 100 in which a navigation preview generation system can be implemented includes a client computing device 10 (also referred to herein as a "client device") configured to execute a geographic application 22, which also can be referred to as "mapping application 22." Depending on the implementation, the application 22 can display an interactive digital map, request and receive routing data to provide driving, walking, or other navigation directions including audio navigation directions, provide various geolocated content, provide navigation previews including panoramic street level imagery of route segments, etc. The client device 10 may be operated by a user displaying a digital map while navigating to various locations.

In addition to the client device 10, the communication system 100 includes a server device 60 configured to provide navigation previews to the client device 10. The server device 60 can be communicatively coupled to a database 80 that stores, in an example implementation, user profiles for users which may include historical routes traversed by a user, a home location of the user, a work location of the user, and other stored locations of the user. The user profiles may also include user interaction data such as data indicative of the user's interactions with previous navigation requests or navigation previews. Additionally, the user profiles may include user behavior data, such as indications of maneuvers the user did not follow, maneuvers where the user requested alternative navigation directions, signs the user did not appear to see, etc. In addition to user profiles, the database 80 may store characteristics of route segments including a type of maneuver for the route segment, a distance and/or time between the maneuver and the previous maneuver, a complexity level for the maneuver, the location of the route segment, the amount of traffic on the route segment, etc. The user characteristics and maneuver characteristics are described in further detail below with reference to FIG. 2.

More generally, the server device 60 can communicate with one or several databases that store any type of suitable geospatial information or information that can be linked to a geographic context. The communication system 100 also can include a navigation data server 34 that provides driving, walking, biking, or public transit directions, for example. Further, the communication system 100 can include a map data server 50 that provides map data to the server device 60 for generating a map display. The devices operating in the communication system 100 can be interconnected via a communication network 30.

In various implementations, the client device 10 may be a smartphone, a tablet computer. The client device 10 may include a memory 20, one or more processors (CPUs) 16, a graphics processing unit (GPU) 12, an I/O module 14 including a microphone and speakers, a user interface (UI) 32, and one or several sensors 19 including a Global Positioning Service (GPS) module. The memory 20 can be a non-transitory memory and can include one or several suitable memory modules, such as random access memory (RAM), read-only memory (ROM), flash memory, other types of persistent memory, etc. The I/O module 14 may be a touch screen, for example. In various implementations, the client device 10 can include fewer components than illustrated in FIG. 1 or conversely, additional components. In other embodiments, the client device 10 may be any suitable portable or non-portable computing device. For example, the client device 10 may be a laptop computer, a desktop computer, a wearable device such as a smart watch or smart glasses, a vehicle head unit, etc.

The memory 20 stores an operating system (OS) 26, which can be any type of suitable mobile or general-purpose operating system. The OS 16 can include application programming interface (API) functions that allow applications to retrieve sensor readings. For example, a software application configured to execute on the computing device 10 can include instructions that invoke an OS 26 API for retrieving a current location of the client device 10 at that instant. The API can also return a quantitative indication of how certain the API is of the estimate (e.g., as a percentage).

The memory 20 also stores a mapping application 22, which is configured to generate interactive digital maps and/or perform other geographic functions, as indicated above. The mapping application 22 can receive navigation instructions, a subset of route segments for a navigation preview, visual and/or audio data for each route segment to include in the navigation preview, and provide the visual and/or audio data via the navigation display 24. The mapping application 22 also can display driving, walking, or transit directions, and in general provide functions related to geography, geolocation, navigation, etc. via the navigation display 24.

It is noted that although FIG. 1 illustrates the mapping application 22 as a standalone application, the functionality of the mapping application 22 also can be provided in the form of an online service accessible via a web browser executing on the client device 10, as a plug-in or extension for another software application executing on the client device 10, etc. The mapping application 22 generally can be provided in different versions for different respective operating systems. For example, the maker of the client device 10 can provide a Software Development Kit (SDK) including the mapping application 22 for the Android™ platform, another SDK for the iOS™ platform, etc.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a navigation preview generator 68, which can generate a navigation preview for a set of navigation directions from a starting location to a destination location. The navigation preview generator 68 may also receive a request for navigation directions for a user from the starting location to the destination location and may retrieve a set of navigation instructions for traversing from the starting location to the destination location via a route. The route may include a set of route segments, where each route segment has a waypoint location at or near the midpoint of the route segment. Each route segment corresponds to a navigation instruction in the set of navigation directions for performing a maneuver and/or passes a traffic signal or POI. The navigation preview generator 68 may then select a subset of the route segments to include in a navigation preview. The subset of the route segments may be selected by assigning a score or ranking to each of the candidate route segments on the route. The candidate route segments may be scored based on characteristics of the maneuver associated with a candidate route segment or based on user characteristics, such as the user's familiarity with the candidate route segment. Other characteristics of the route segment may also be used, such as characteristics of the route segment itself that are agnostic of user characteristics. The navigation preview generator 68 may generate a preview for each selected route segment which may include panoramic street level imagery of the area surrounding the waypoint for the selected route segment. The preview may also include audio describing the maneuver for the selected route segment, where the audio is different from an audio navigation instruction provided during navigation. For example, the audio during the preview may have additional details from the audio provided during navigation, such as there is a new charging station coming up on the left side. The audio during the preview may also provide additional context from the audio provided during navigation. The navigation preview generator 68 may provide the navigation preview for the selected subset of route segments to the client device 10 which are then provided by the navigation display 24 via the UI and/or the speaker. In some implementations, the navigation preview is provided in response to the user selecting a user control, via the mapping application 22, to view a preview of a set of navigation directions.

The navigation preview generator 68 and the navigation display 24 can operate as components of a navigation preview generation system. Alternatively, the navigation preview generation system can include only server-side components and simply provide the navigation display 24 with instructions to provide the navigation preview. In other words, navigation preview generation techniques in these embodiments can be implemented transparently to the navigation display 24. As another alternative, the entire functionality of the navigation preview generator 68 can be implemented in the navigation display 24.

For simplicity, FIG. 1 illustrates the server device 60 as only one instance of a server. However, the server device 60 according to some implementations includes a group of one or more server devices, each equipped with one or more processors and capable of operating independently of the other server devices. Server devices operating in such a group can process requests from the client device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the navigation display 24 operating in the client device 10 receives and transmits data to the server device 60. Thus, in one example, the client device 10 may transmit a communication to the navigation preview generator 68 (implemented in the server device 60) requesting navigation directions from a starting location to a destination. Accordingly, the navigation preview generator 68 may obtain a set of navigation directions from the starting location to the destination. The set of navigation directions may include navigation instructions each describing a route segment of a route. The navigation preview generator 68 may then select a subset of the route segments to include in a navigation preview.

Figure 2:
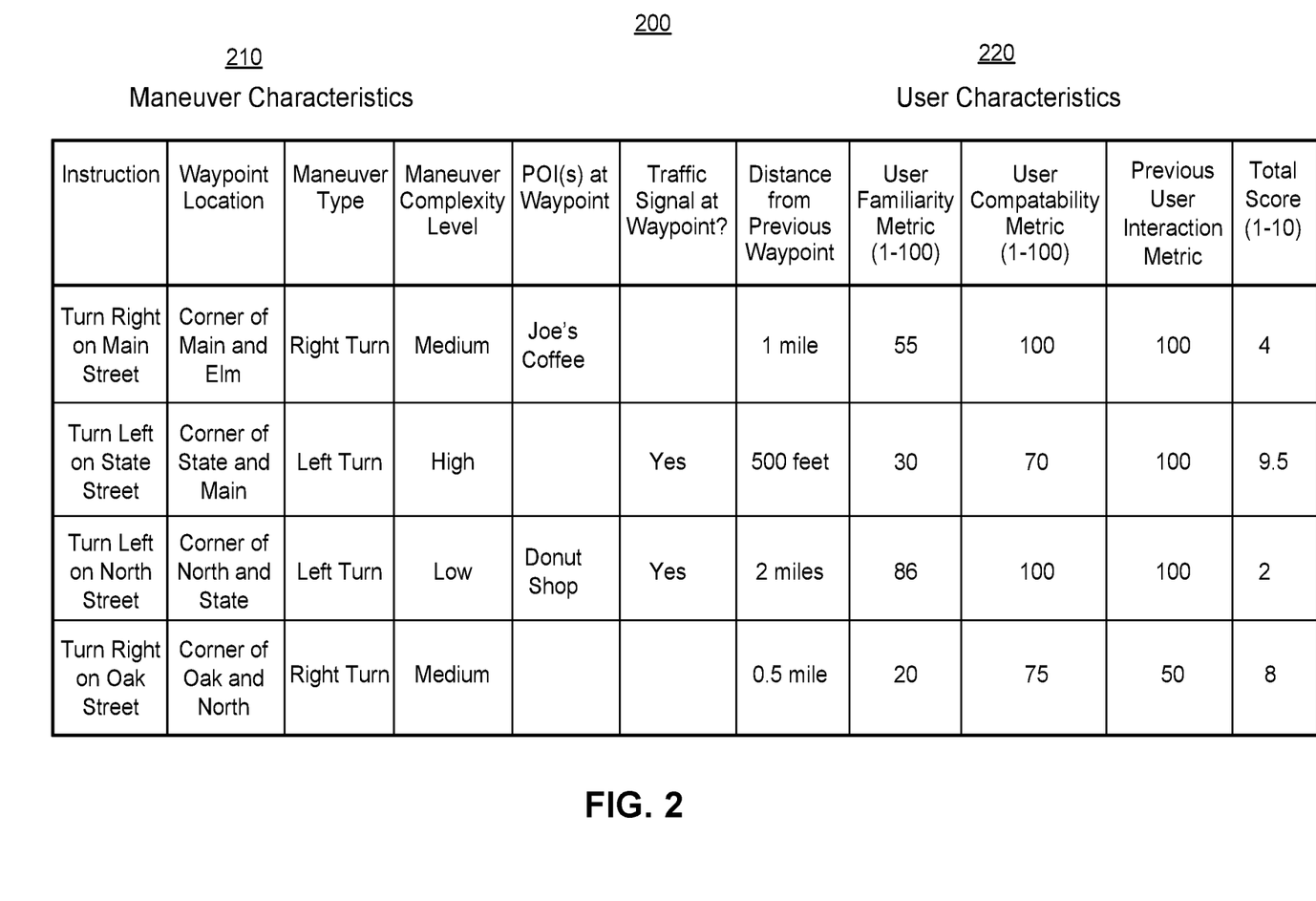
FIG. 2 is an example data table which the navigation preview generation system of FIG. 1 can utilize to select a subset of route segments within a set of navigation directions to include in a navigation preview.

As mentioned above, the navigation preview generator 68 may select the subset of route segments from the candidate route segments within the route by assigning a score or ranking to each candidate route segment based on characteristics of the maneuver associated with the candidate route segment and/or characteristics of the user. FIG. 2 illustrates an example data table 200 that may be used to score and/or rank the candidate route segments. In some embodiments, the data table 200 may be stored in the database 80. The data table 200 may include one or more of: maneuver characteristics 210, user characteristics 220, and a score or ranking of the candidate route segment based on the maneuver characteristics 210 and user characteristics 220. The maneuver characteristics 210 may include the location of the waypoint where the maneuver is performed. While the waypoint location column in the data table includes an intersection, the location may be GPS coordinates, a street address, or any other suitable location. The maneuver characteristics 210 may also include the type of maneuver, such as a turn in a four-way intersection, a turn in a six-way intersection, a roundabout, a highway merge, a highway exit, a U-turn, a hard turn (e.g., a turn greater than a threshold angle), a slight turn (e.g., a turn less than a threshold angle), a lane change, continuing straight, etc.

Furthermore, the maneuver characteristics may include a complexity level for the maneuver. The complexity level may be a complexity score such as from 1 to 100, may be a category such as "Very Low," "Low," "Medium," "High," "Very High," etc., or may be indicated in any other suitable manner. The complexity level for a maneuver may be determined based on the maneuver type, such as a turn in a four-way intersection, a turn in a six-way intersection, a roundabout, a U-turn, a highway merge, a highway exit, etc. The complexity level may also be determined based on the amount of time or distance between the upcoming maneuver and the previous maneuver. Maneuvers which occur shortly after previous maneuvers may have higher complexity levels. Furthermore, the complexity level may be determined based on the number of lanes that the user needs to change to perform the maneuver. For example, the navigation preview generator 68 may compare an initial lane for the user after performing the previous maneuver to a final lane for the user to perform the upcoming maneuver. The complexity level may increase as the number of lane changes increases for performing the maneuver.

Additionally, the maneuver characteristics 210 may include the point(s) of interest at the waypoint location for the maneuver, and whether there is a traffic signal such as a traffic light or stop sign at the waypoint location for the maneuver. In some scenarios, the navigation preview generator 68 may increase the score for a candidate route segment having a traffic signal, since the user may want to see how to perform the maneuver in view of the traffic signal (e.g., whether to get into the left turn lane, whether to make a hard left or a slight left turn at the intersection, etc.). Additionally, the navigation error preview generator 68 may increase the score for a candidate route segment where a particular POI is visible from the waypoint location for the maneuver. In other words, in some embodiments, the selected route segments may be selected based on the route segment having a point-of-interest nearby (e.g., the point-of-interest is depicted in panoramic imagery corresponding to the route segment). Such embodiments are particularly advantageous for achieving the technical effect of assisting a user in navigation, because seeing the POI in the navigation preview may provide the user with a frame of reference when performing the maneuver during navigation. Still further, the maneuver characteristics 210 may include the distance from the waypoint for the upcoming maneuver and the waypoint for the previous maneuver. As mentioned above, maneuvers which occur shortly after previous maneuvers may have higher complexity levels, and including these candidate route segments in the navigation preview may help the user see how quickly she needs to prepare for the next maneuver after performing the previous maneuver.

While the example maneuver characteristics 210 include any one or more of: the waypoint location for the maneuver, the type of maneuver, the maneuver complexity level, the POI(s) and/or traffic signal at the waypoint location, and the distance between consecutive maneuvers as maneuver characteristics 210, these are merely a few examples of maneuver characteristics for ease of illustration only. Any suitable characteristics indicative of the maneuver may be used as maneuver characteristics 210.

In addition to maneuver characteristics 210, the data 200 may include user characteristics 220. The user characteristics 220 may include a user familiarity metric, which may be a familiarity score such as from 1 to 100, may be a category such as "Very Low," "Low," "Medium," "High," "Very High," etc., or may be indicated in any other suitable manner. The user familiarity metric for a candidate route segment may be determined for example, based on the user's past navigation requests and the user's home location. The navigation preview generator 68 may obtain user-specific data such as user identity data, past driving data, the user's home location, etc. Some or all of this data can come from a user profile maintained by an online service that provides navigation data, such as the mapping application 22. The online service also may allow the user to store her personal preferences such as preferred routes, toll/no toll road preferences, etc. In addition, the user can store a home location which may be selected to direct the user to her home or can be used to determine the distance from the user's home for a candidate route segment. The user profile can also reflect the user's previous navigation requests.

The navigation preview generator 68 may then use the user-specific data to generate the user familiarity metric for each candidate route segment. For example, if the candidate route segment is reflected in the user's past driving data, and if it is also determined the candidate route segment is close to the user's home (e.g., within 2 miles), the user familiarity metric may be very high.

Additionally, the user characteristics 220 may include a user compatibility metric which also may be determined based on the user-specific data. In addition to the user-specific data described above, the user profile may include behavioral data for the user, such as whether the user followed a particular navigation instruction during a previous navigation request, whether the user avoided a particular type of maneuver during a previous navigation request, whether the user missed a sign during a previous navigation request, etc. The navigation preview generator 68 may compare the maneuver for the candidate route segment to the behavioral data for the user to determine whether the maneuver has been avoided or was performed incorrectly in the past. The navigation preview generator 68 may adjust the user compatibility metric when the maneuver for the candidate route segment is similar to maneuvers the user previously avoided or was unable to perform. In this manner, a candidate route segment may be more likely to be included in the navigation preview to help the user prepare for a maneuver in which the user had difficulty performing in the past.

Furthermore, the user characteristics 220 may include a previous user interaction metric. The previous interaction metric may be determined based on the user's previous interactions with navigation previews. The user profile may include for each route segment in previous navigation previews, the amount of time in which the user viewed the navigation preview of a particular route segment, the number of times the user played the audio for the navigation preview of the particular route segment, the number of times the user viewed the navigation preview of the particular route segment, refinements to the navigation preview such as panning or zooming the panoramic street level imagery or requesting a particular route segment be included in the navigation preview, user feedback data, such as by selecting user controls indicating whether or not the user had difficulty traversing the route segment (e.g., thumbs up or thumbs down buttons), etc. The navigation preview generator 68 may adjust the previous user interaction metric based on the number of times and the amount of time the user previously viewed or played audio for the navigation preview of the same route segment as the candidate route segment or for the same or a similar maneuver as the candidate route segment. Additionally, the navigation preview generator 68 may adjust the previous user interaction metric based on refinements to the same route segment as the candidate route segment. For example, panning or zooming the street level imagery for the route segment or specifically requesting a navigation preview for the route segment may indicate that the user was interested in more information about the route segment. A feedback loop can therefore be used to optimize the information provided to the user about particular route segments (i.e. providing additional information about certain segments) thereby furthering the technical effect of assisting a user in performing the technical task of navigation.

While the example user characteristics 220 include any one or more of: the user familiarity metric, the user compatibility metric, and the previous user interaction metric as user characteristics 220, these are merely a few examples of maneuver characteristics for ease of illustration only. Any suitable characteristics indicative of the maneuver may be used as user characteristics 220. For example, the user characteristics may also include an indication as to whether the user has a preference for the POI(s) at the waypoint location for the maneuver corresponding to the candidate route segment. The user profile may include a list of POIs and/or other landmarks which the user prefers. If one of the POIs at the waypoint location for the maneuver corresponding to the candidate route segment is a preferred POI by the user, the navigation preview generator 68 may include the candidate route segment in the navigation preview to show the preferred POI to the user who may be interested in stopping at the preferred POI.

In any event, the navigation preview generator 68 may generate a score or ranking for each candidate route segment based on the maneuver characteristics and/or the user characteristics for the candidate route segment. In some implementations, the navigation preview generator 68 may generate an individual score for each maneuver characteristic and/or for each user characteristic for the candidate route segment. The navigation preview generator 68 may then aggregate or combine the individual scores in any suitable manner to generate an overall score for the candidate route segment. For example, the navigation preview generator 68 may assign weights to each individual score and combine the weighted scores to generate the overall score for the candidate route segment. The navigation preview generator 68 may also combine the inverse of some of the individual scores, such as when a lower individual score increases the need to include the candidate route segment in the navigation preview. For example, a lower user compatibility metric may indicate that the user has a difficult time performing the maneuver for the candidate route segment and may need more time to review the maneuver in the navigation preview before following the navigation instructions.

In other implementations, the navigation preview generator 68 may generate a score or ranking for each candidate route segment using various machine learning techniques such as a regression analysis (e.g., a logistic regression, linear regression, or polynomial regression), k-nearest neighbors, decisions trees, random forests, boosting (e.g., extreme gradient boosting), neural networks, support vector machines, deep learning, reinforcement learning, Bayesian networks, etc. The navigation preview generator 68 may generate the machine learning model based on training data which includes maneuver characteristics, user characteristics, and predetermined scores for route segments included in previous navigation previews. The navigation preview generator 68 then analyzes the training data to generate a machine learning model for determining scores for route segments within a route requested by a user. Then the navigation preview generator 68 applies the maneuver characteristics and user characteristics for each of the candidate route segments to the machine learning model to generate the scores for the candidate route segments. In this implementation, machine learning techniques are employed for the specific technical application of navigation and assisting a user in performing the technical task of navigation. In other words, the machine learning techniques serve a technical purpose in the context of navigation and contribute to producing a technical effect of assisting a user in navigation.

In any event, the navigation preview generator 68 may select a subset of the candidate route segments having overall scores above a threshold score or ranked above a threshold ranking in accordance with the overall scores. The navigation preview generator 68 may include the selected subset of route segments in the navigation preview. In some implementations, the navigation preview generator 68 may provide the set of navigation directions to the client device 10 for display via the mapping application 22. The navigation preview generator 68 may also provide an indication of the selected subset of route segments to the client device 10 for the client device 10 to generate the navigation preview based on the selected subset of route segments. In other implementations, the navigation preview generator 68 may generate the navigation preview based on the selected subset of route segments and provide the navigation preview to the client device 10. Then in response to receiving a selection of a user control within the mapping application 22 to provide a navigation preview, the client device 10 may provide the navigation preview for the selected subset of route segments.

In some implementations, the navigation preview generator 68 generates the navigation preview along with the set of navigation directions and provides the set of navigation directions and the navigation preview to the client device 10. In other implementations, the navigation preview generator 68 obtains the set of navigation directions and provides the set of navigation directions to the client device 10. Then in response to receiving a selection of a user control to view a navigation preview, the client device 10 transmits a request for a preview of the set of navigation directions and the navigation preview generator 68 generates and provides the preview to the client device 10.

For each route segment in the selected subset of route segments, the navigation preview generator 68 may generate a display of panoramic street level imagery of the area corresponding to the route segment. The panoramic street level imagery may refer to a photorealistic representation of geolocated imagery including real-world objects which may be viewed by a user from a particular geographic location, such as a street level view of the user's surroundings from the user's current location to simulate the experience of walking down a street and exploring the neighborhood. The panoramic street level imagery may be captured using specialized equipment such as a high-resolution camera with a wide-angle lens or fish eye lens and/or image sensors such as LIDAR (Light Detection and Ranging) sensors to detect depth. Several photographs of geolocated imagery captured by the camera or by several cameras having narrow lenses may then be stitched together to generate the panoramic street level imagery. The panoramic street level imagery may be rendered onto a surface of a virtual cylinder to simulate the feeling that a user is in the middle of a scene, such as a rectangular cross-section of the virtual cylinder or onto any other surface of a three-dimensional solid centered around the perspective of the user. In another example, the panoramic street level imagery may include a three-dimensional rendering of real-world buildings, trees, signs, and other objects located within the geographic area represented by the panoramic view. Furthermore, the panoramic street level imagery may include any combination of photographs projected onto a virtual cylinder and three-dimensional renderings of real-world objects located within the geographic area. The panoramic street level imagery may be displayed from the perspective of a virtual camera.

In some implementations, the database 80 or a server such as the map data server may store panoramic street level imagery for several geographic areas. For a route segment in the selected subset, the navigation preview generator 68 may obtain panoramic street level imagery for the geographic area corresponding to the route segment. In some implementations, the navigation preview generator 68 may generate a video display for the route segment which includes video frames depicting panoramic street level imagery for geographic areas leading up to, at, and subsequent to the waypoint location for the maneuver for the route segment.

In addition to the panoramic street level imagery, the navigation preview generator 68 may generate audio to include the navigation preview. In some implementations, the navigation preview generator 68 generates audio for some route segments and not for others. For example, when the user is familiar with the route segment according to the user familiarity metric, the navigation preview generator 68 may not generate audio for the route segment. In another example, when the complexity level for the route segment is below a threshold complexity, the navigation preview generator 68 may not generate audio for the route segment. In any event, the audio may include a description of the maneuver for the route segment, where the audio for the navigation preview is different from the audio navigation instruction provided during navigation. For example, the audio for the navigation preview may be more detailed than the audio navigation instruction provided during navigation. The audio during the preview may also provide additional context from the audio provided during navigation. More specifically, the audio for the navigation preview may include a description of the maneuver, a description of POIs or other landmarks which may help guide the user when performing the maneuver, a description of traffic signals which may help guide the user when performing the maneuver, etc. In other words, the additional information provided in the form of the audio information can assist the user in performing the technical task of navigation, and specifically the technical task of carrying out a maneuver during navigation. For example, whereas the audio navigation instruction during navigation may be, "In 500 ft, turn left onto State Street," the audio during the navigation preview may explain, "In 500 ft, you will be approaching a traffic light where you will see Joe's Coffee to your left. Enter the left turn lane at the traffic light and make a slight left turn toward Fred's Gas Station which you will see on the right side after making the turn." Such additional information (e.g., Joe's coffee being on the left) may be superfluous at the time of actually carrying out the maneuver. It is therefore advantageous to provide this information ahead of time and during the preview of the route segment, so that a user has access to the information and can store the information. Providing this information ahead of time also prevents distractions when the user is carrying out the maneuver, which enables a user to carry out the maneuver more safely.

Example Navigation Display and Navigation Preview

Figure 3:
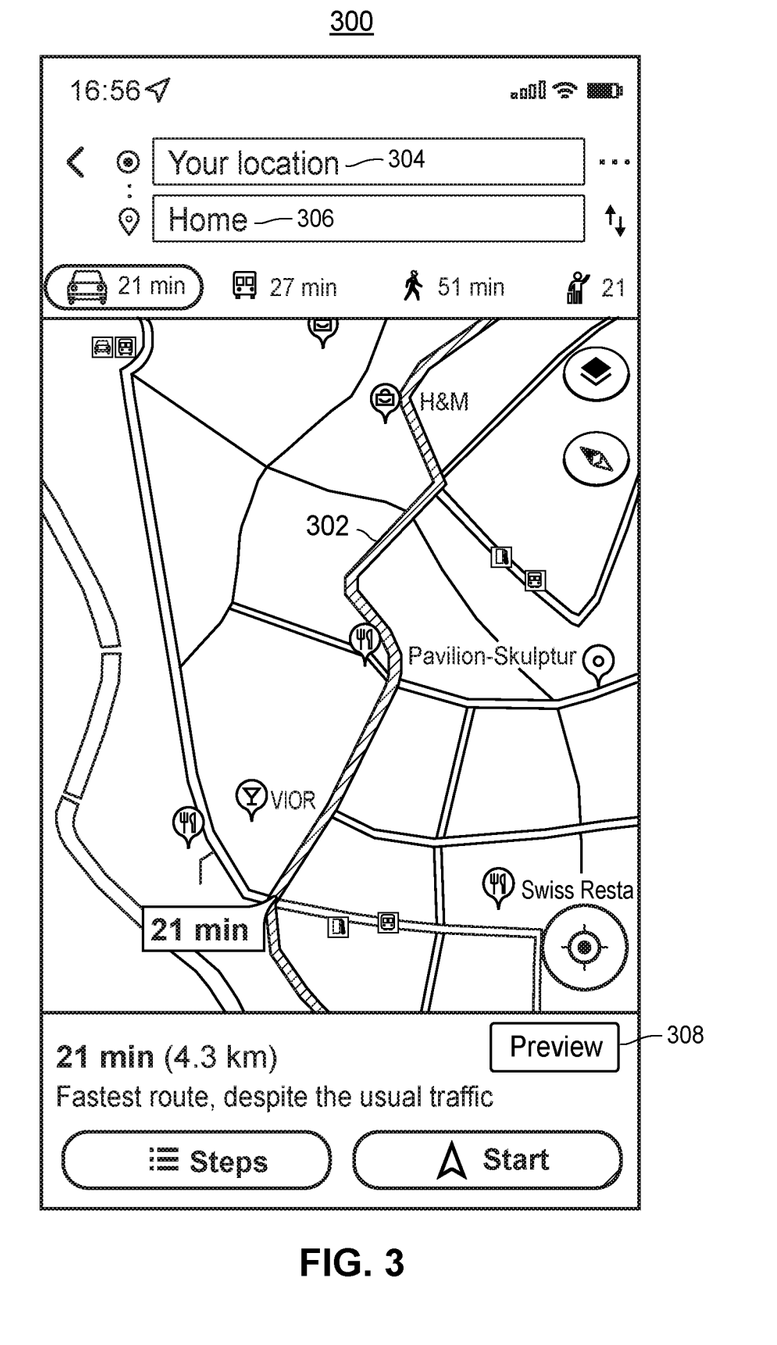
FIG. 3 illustrates an example navigation display indicating a route from a starting location to a destination location and including a user control to view a preview of route segments within the route.

As mentioned above, in response to a request for navigation directions from a starting location to a destination location, the mapping application 22 executing on the client device 10 may provide the navigation directions via the navigation display 24. FIG. 3 illustrates an example navigation display 300 indicating a route 302 from a starting location 304 to a destination location 306 and including a user control 308 to view a navigation preview.

In response to receiving a selection of the user control 308, the navigation display 24 may provide the navigation preview which includes panoramic street level imagery and/or audio for a selected subset of route segments within the route. The navigation preview may also include user controls for traversing from one route segment to the next, for panning or zooming the display of panoramic street level imagery for a particular route segment, and for exiting the navigation preview. This provides the user with additional control over the preview, so that the user can process the preview information ahead of navigation. Furthermore, the navigation preview may include a user control for playing audio describing the maneuver for a particular route segment and/or the navigation preview may automatically play the audio when the panoramic street level imagery for a particular route segment is provided. Still further, the navigation preview may include video of the panoramic street level imagery for an area leading up to, at, and subsequent to the waypoint location for the maneuver for the particular route segment, so that the user may see a video enactment of the maneuver.

Figure 4A:
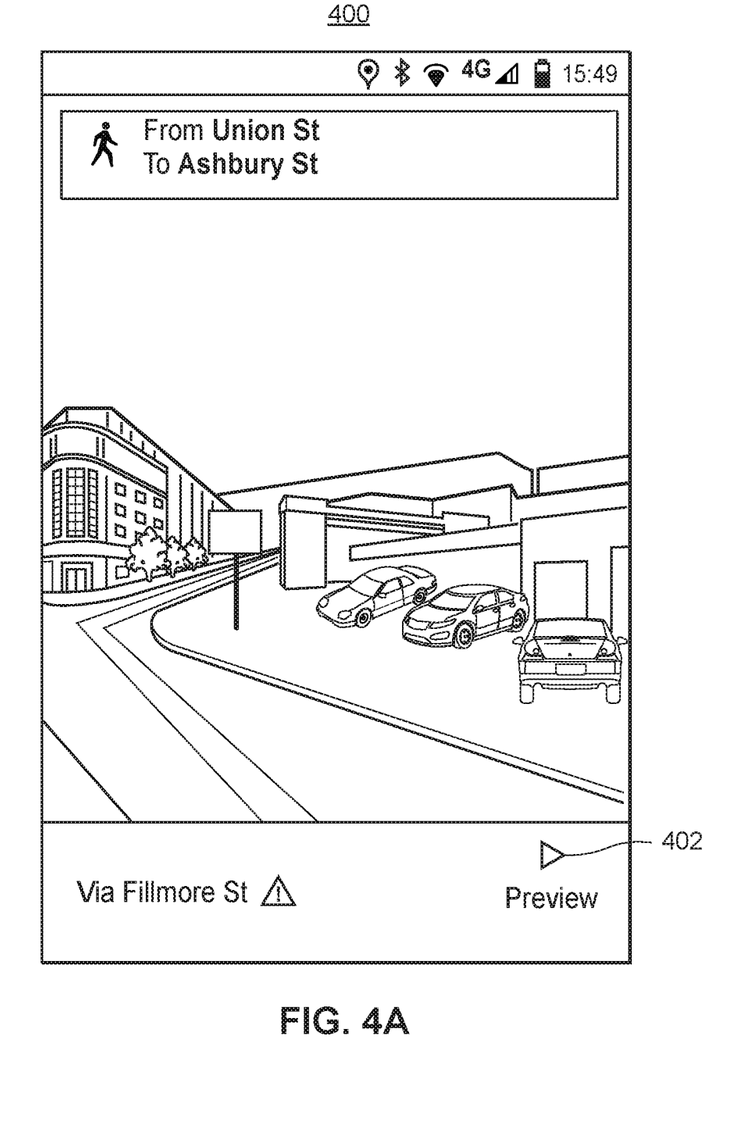
FIGS. 4A-4C illustrate example video frames of a preview of a particular route segment, including video frames of panoramic street level imagery depicting an area leading up to, at, and subsequent to the waypoint location for the maneuver for the route segment.
Figure 4B:
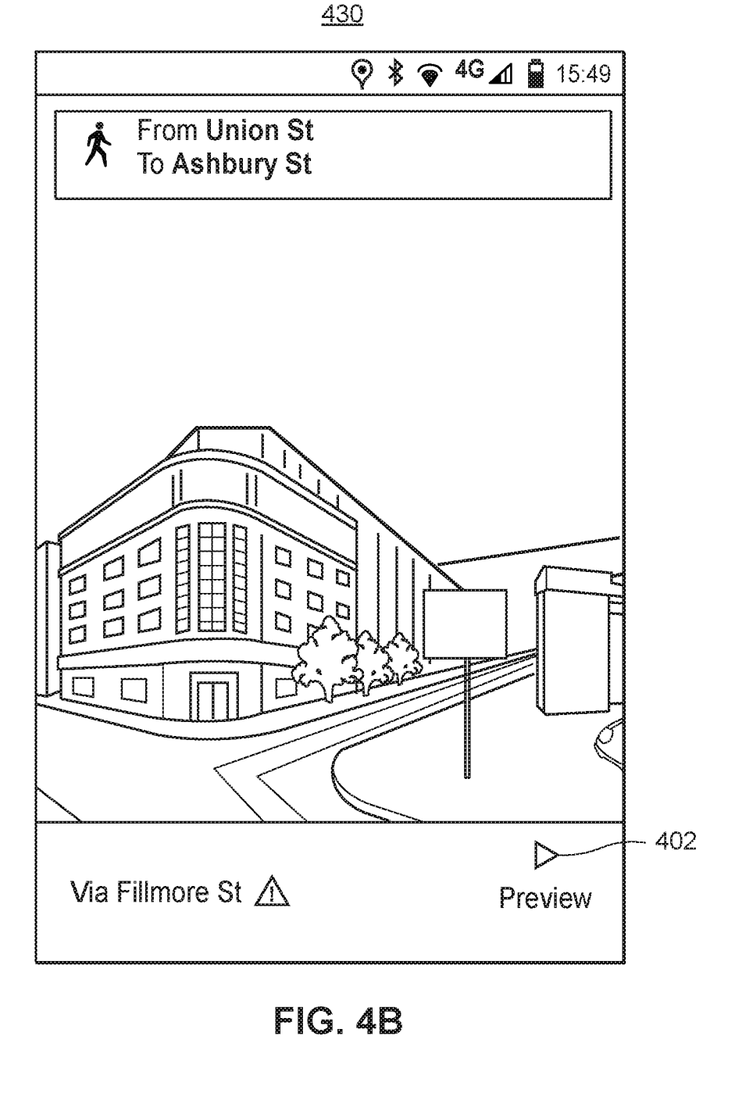
Figure 4C:
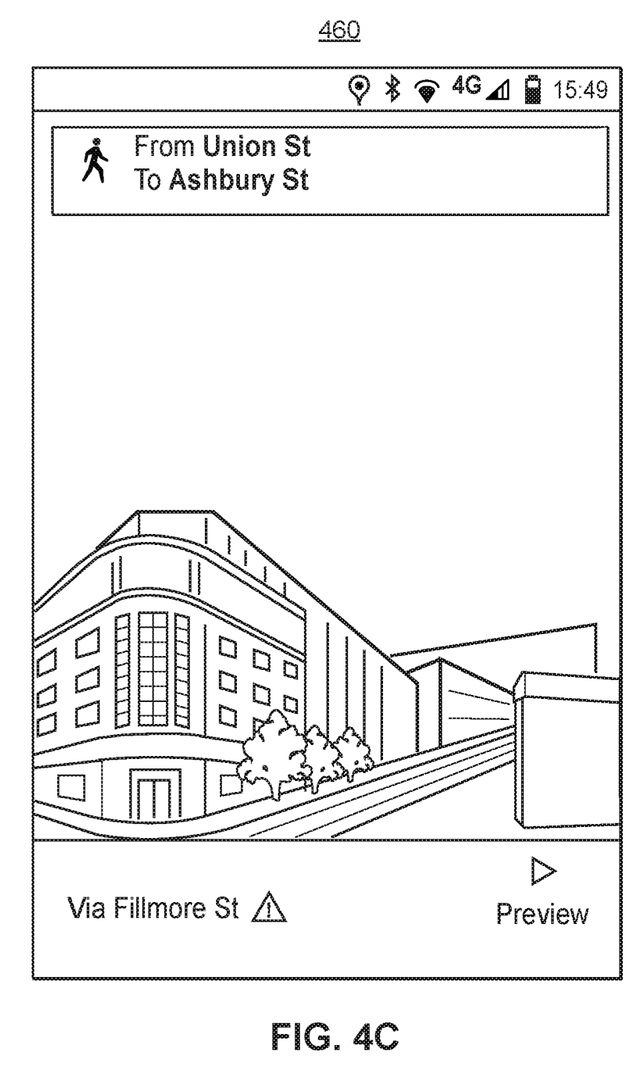

FIGS. 4A-4C illustrate example video frames 400-460 of a preview of a particular route segment, including video frames of panoramic street level imagery depicting an area leading up to 400, during 430, and subsequent to 460 the maneuver for the route segment. As shown in FIG. 4A, the panoramic street level imagery depicting the area leading up to 400 the maneuver for the route segment is provided at a view from a distance of the waypoint for the maneuver. In this manner, the user can see where she will be approaching the waypoint from. The video frame 400 may include a user control for playing the audio describing the maneuver and may include user controls for stopping, playing, and pausing the video. The video frame 400 may also include user controls for exiting the video mode so that the user can pan and zoom the panoramic street level imagery without viewing a video enactment of the maneuver. Still further, the video frame includes a user control 402 for traversing to the next route segment in the navigation preview. As shown in FIG. 4B, the panoramic street level imagery depicting the area during 430 the maneuver for the route segment is provided at a view directly above or near the waypoint for the maneuver. As shown in FIG. 4C, the panoramic street level imagery depicting the area subsequent to 460 the maneuver for the route segment is provided at a view which no longer shows the waypoint for the maneuver and instead begins to show the area for the next route segment on the route. The panoramic street level imagery may also include visual indicators overlaid on the panoramic street level imagery, such as arrows pointing at signs, showing where to turn, pointing at POIs or traffic signals, etc.

In some implementations, the client device 10 may operate within a vehicle having a vehicle head unit. The client device 10 communicates with the vehicle head unit via a communication link, which may be wired (e.g., Universal Serial Bus (USB)) or wireless (e.g., Bluetooth, Wi-Fi Direct). In such implementations, the vehicle head unit may provide the navigation directions while the client device 10 provides the navigation preview. Then when the vehicle is stopped or in park, the vehicle head unit may provide the navigation preview for the user to preview upcoming maneuvers on the route.

Also in some implementations, the client device 10 may obtain an expected date and/or time. For example, the user may request the navigation directions for an upcoming trip and may indicate the date and/or time of the trip via user controls at the mapping application. In another example, the expected date and/or time may be the current time when the user plans to review the navigation preview shortly before beginning the trip. In any event, the client device 10 may adjust style parameters for the panoramic street level imagery in accordance with the expected date and/or time for the trip. For example, if the expected date and/or time for the trip is at night, the panoramic street level imagery may be provided in a night view with darker features than the daytime view for the panoramic street level imagery. In another example, if the expected date and/or time is during the winter or at a time when the weather forecast is for rain, the panoramic street level imagery may include snow or rain. In yet another example, if the expected date and/or time is when traffic conditions are expected to be heavy, the panoramic street level imagery may include several vehicles on the roads. If the expected date and/or time is when traffic conditions are expected to be light, the panoramic street level imagery may not include vehicles on the roads or may include a small number of vehicles on the roads. In some implementations, the client device 10 may transmit the expected date and/or time when the user is planning on traversing the navigation directions to the server device 60. The server device 60 may then adjust the style parameters for the panoramic street level imagery by for example, obtaining a weather forecast for the expected date and/or time and adjusting the panoramic street level imagery in accordance with the estimated weather conditions, or obtaining sunrise and sunset times for the expected date and comparing the sunrise and sunset time to the expected time to determine whether the trip will occur during daylight or at night. These implementations are particularly advantageous as adjusting style parameters enables a user to become familiar with the route segments under specific conditions. For example, the user can be made aware of the appearance of route segments at night, which may appear differently than the route segments in the day. The user is therefore further assisted by these features in performing navigation, since the user will already be aware of the appearance of various route segments that she will be navigating.

The trip conditions including the time of day and/or time of year for the trip, weather conditions for the trip, etc., may also be included as characteristics of each route segment. Accordingly, the server device 60 may generate a score or ranking for each candidate route segment based on the trip conditions and optionally the maneuver characteristics and/or the user characteristics, for the candidate route segment. In some implementations, the server device 60 may generate an individual score for each maneuver characteristics, for each user characteristic for the candidate route segment, and for each trip condition for the candidate route segment. The server device 60 may then aggregate or combine the individual scores in any suitable manner to generate an overall score for the candidate route segment. For example, the server device 60 may assign weights to each individual score and combine the weighted scores to generate the overall score for the candidate route segment.

Figure 5:
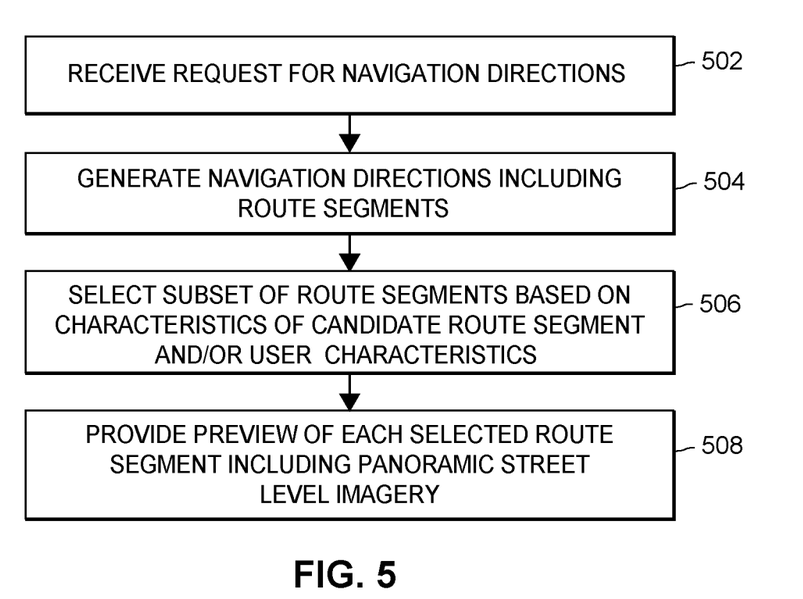
FIG. 5 is a flow diagram of an example method for providing a navigation directions preview, which may be implemented in a server device.

FIG. 5 illustrates an example method 500 for providing a navigation directions preview, which can be implemented at a server device 60. The method can be implemented in a set of instructions stored on a computer-readable memory and executable at one or more processors of the server device 60. For example, the method can be implemented by the navigation preview generator 68.

At block 502, a request for navigation directions is received for navigating from a starting location to a destination location via a route. The request may be received from a client device 10 executing a mapping application 22. At block 504, the server device 60 generates a set of navigation directions in response to the request. The set of navigation directions may be generated by transmitting the request to a navigation server 34 for navigation directions from the starting location to the destination location. The navigation server 34 may then transmit the set of navigation directions to the server device 60, where the set of navigation directions includes navigation instructions for navigating from each segment of the route to the next at respective waypoints.

At block 506, the server device 60 selects a subset of the candidate route segments for the route to include in a navigation preview. The server device 60 may select the subset of candidate route segments by assigning a score and/or ranking to each candidate route segment on the route and selecting candidate route segments scored above a threshold score or ranking above a threshold ranking. The server device 60 scores or ranks the candidate route segments based on characteristics of the candidate route segment and/or user characteristics.

The characteristics of the candidate route segment may include one or more of: the location of a waypoint where a maneuver corresponding to the candidate route segment is performed, the type of maneuver, a complexity level for the maneuver, point(s) of interest at the waypoint location for the maneuver, whether there is a traffic signal such as a traffic light or stop sign at the waypoint location for the maneuver, the distance from the waypoint for the upcoming maneuver and the waypoint for the previous maneuver, etc.

The user characteristics may include a user familiarity metric which may be determined for example, based on the user's past navigation requests and the user's home location. The user characteristics may also include a user compatibility metric which may be determined based on behavioral data for the user, such as whether the user followed a particular navigation instruction during a previous navigation request, whether the user avoided a particular type of maneuver during a previous navigation request, etc. The user compatibility metric may be determined by comparing the maneuver for the candidate route segment to the behavioral data for the user to determine whether the maneuver has been avoided or was performed incorrectly in the past. Furthermore, the user characteristics may include a previous user interaction metric which may be determined based on the user's previous interactions with navigation previews.

The server device 60 may generate a score or ranking for each candidate route segment based on the maneuver characteristics and/or the user characteristics for the candidate route segment. In some implementations, the server device 60 may generate an individual score for each maneuver characteristics and for each user characteristic for the candidate route segment. The server device 60 may then aggregate or combine the individual scores in any suitable manner to generate an overall score for the candidate route segment. For example, the server device 60 may assign weights to each individual score and combine the weighted scores to generate the overall score for the candidate route segment. The server device 60 may also combine the inverse of some of the individual scores, such as when a lower individual score increases the need to include the candidate route segment in the navigation preview.

Then, the server device 60 provides a navigation preview of each selected route segment to the client device 10 for presentation, for example via the navigation display 24 (block 508). In some implementations, the server device 60 may provide the set of navigation directions to the client device 10 for display via the mapping application 22. The server device 60 may also provide an indication of the selected subset of route segments to the client device 10 for the client device 10 to generate the navigation preview based on the selected subset of route segments.

In other implementations, the server device 60 may generate the navigation preview based on the selected subset of route segments and provide the navigation preview to the client device 10. Then in response to receiving a selection of a user control within the mapping application 22 to provide a navigation preview, the client device 10 may provide the navigation preview for the selected subset of route segments.

In some implementations, the server device 60 generates the navigation preview along with the set of navigation directions and provides the set of navigation directions and the navigation preview to the client device 10. In other implementations, the server device 60 obtains the set of navigation directions and provides the set of navigation directions to the client device 10. Then in response to receiving a selection of a user control to view a navigation preview, the client device 10 transmits a request for a preview of the set of navigation directions and the server device 60 generates and provides the preview to the client device 10.

For each route segment in the selected subset of route segments, the server device 60 may generate a display of panoramic street level imagery of the area corresponding to the route segment. In some implementations, the server device 60 may generate a video display for the route segment which includes video frames depicting panoramic street level imagery for geographic areas leading up to, at, and subsequent to the waypoint location for the maneuver for the route segment.

In addition to the panoramic street level imagery, the server device 60 may generate audio to include the navigation preview. The audio may include a description of the maneuver for the route segment, where the audio for the navigation preview is different from the audio navigation instruction provided during navigation. For example, the audio for the navigation preview may be more detailed than the audio navigation instruction provided during navigation. The audio during the preview may also provide additional context from the audio provided during navigation. More specifically, the audio for the navigation preview may include a description of the maneuver, a description of POIs or other landmarks which may help guide the user when performing the maneuver, a description of traffic signals which may help guide the user when performing the maneuver, etc.

In some implementations, the method can be implemented by a combination of the server device 60 and the client device 10. For example, while the server device 60 may generate the route segments and assign scores or rankings to each of the route segments, the client device 10 may select the subset of the candidate route segments for the route to include in the navigation preview, for example based on the assigned scores or rankings. In another example, the client device may assign the score or rankings to each of the route segments or may adjust the scores or re-rank the route segments. Then the client device 10 may select the subset of the candidate route segments based on the adjusted scores or rankings.

Figure 6:
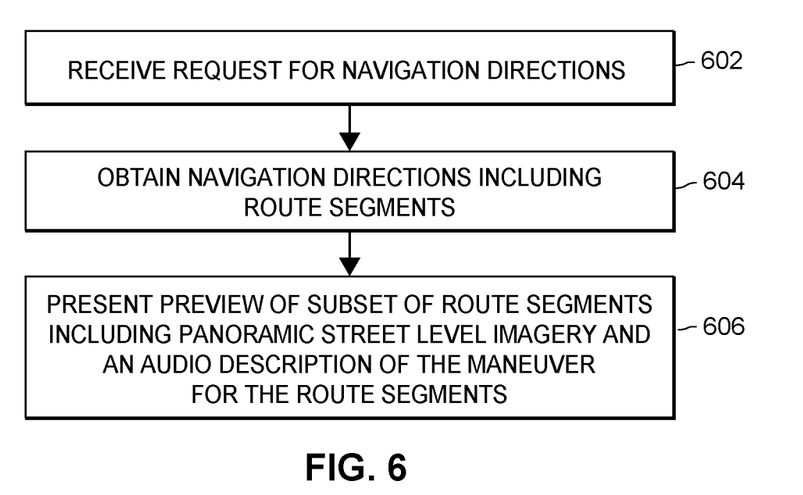
FIG. 6 is a flow diagram of an example method for providing a navigation directions preview, which may be implemented in a client device.

FIG. 6 illustrates an example method 600 for providing a navigation directions preview, which can be implemented at a client device 10. The method can be implemented in a set of instructions stored on a computer-readable memory and executable at one or more processors of the client device 10. For example, the method can be implemented by the navigation display 24.

At block 602, a request for navigation directions is received for navigating from a starting location to a destination location via a route. At block 604, the client device 10 obtains a set of navigation directions in response to the request. The set of navigation directions may be obtained by transmitting the request to the server device 60 for navigation directions from the starting location to the destination location. The server device 60 may then transmit the set of navigation directions to the client device 10, where the set of navigation directions includes navigation instructions for navigating from each segment of the route to the next at respective waypoints.

Then at block 606, the client device provides a navigation preview for a subset of the route segments. In some implementations, the client device 10 may provide an indication of the route from the starting location to the destination location via the mapping application 22 with a user control for viewing a preview of the route. The client device 10 may then provide the navigation preview in response to receiving a selection of the user control.

For each of the subset of route segments, the navigation preview may include panoramic street level imagery of the area corresponding to the route segment, and an audio description of the maneuver for the route segment. The audio description in the navigation preview may be different from an audio navigation instruction included during navigation and may include additional details which are omitted during navigation. In some implementations, the client device 10 may provide a video display for the route segment in the navigation preview which includes video frames depicting panoramic street level imagery for geographic areas leading up to, at, and subsequent to the waypoint location for the maneuver for the route segment.

Also in some implementations, the client device 10 may provide user controls for traversing from one route segment to the next in the navigation preview, for switching from an interactive mode in which the user can pan and zoom within the panoramic street level imagery to a video mode which presents a video enactment of the maneuver for a route segment, for stopping, playing, and pausing the video, for panning and zooming the panoramic street level imagery, and for exiting the navigation preview.

In some implementations, the method can be implemented by a combination of the server device 60 and the client device 10. For example, while the client device 10 may presents a navigation preview for a subset of the route segments, the server device 60 may generate an audio description of the maneuver for the route segment to include in the navigation preview. In other implementations, the client device 10 generates the audio description of the maneuver for the route segment to include in the navigation preview.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for generating navigation previews through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing a navigation directions preview, the method comprising:
receiving, at one or more processors, a request for navigation directions from a starting location to a destination location;
generating, by the one or more processors, a set of navigation directions in response to the request, the set of navigation directions including a set of route segments on a route for traversing from the starting location to the destination location;
filtering, by the one or more processors, the set of route segments into a subset of the route segments for previewing the route based on a complexity level for a maneuver for each route segment in the set of route segments, the complexity level determined based on an amount of time or distance between the maneuver and a previous maneuver; and
for the filtered subset of route segments, providing, by the one or more processors, previews of the subset of route segments to be displayed on a client device, the previews of the subset of route segments including panoramic street level imagery depicting the subset of route segments.

2. The method of claim 1, wherein filtering the subset of the route segments based on the complexity level for each route segment includes:
assigning, by the one or more processors, a score or ranking to each route segment based on the complexity level of the route segment; and selecting, by the one or more processors, the route segments having a score above a threshold score or ranked above a threshold ranking.

3. The method of claim 1, wherein the subset of the route segments is further filtered based on at least one of:
- a point of interest (POI) visible from the route segment,
- a traffic signal associated with the route segment,
- a type of maneuver for the route segment, or
- an amount of time or distance between consecutive maneuvers for consecutive route segments.

4. The method of claim 1, wherein the subset of the route segments is further filtered based on characteristics of a user requesting the navigation directions.

5. The method of claim 4, wherein the subset of the route segments is filtered by assigning a familiarity metric to each route segment according to historical route data for the user indicative of the user's familiarity with the route segment.

6. The method of claim 4, wherein the subset of the route segments is filtered by determining behavioral attributes of the user from previous navigation sessions, and assigning a compatibility metric to each route segment based on comparing characteristics of the route segment to the behavioral attributes of the user.

7. The method of claim 4, wherein the subset of the route segments is filtered based on indications of previous interactions with previous navigation previews.

8. A computing device for providing a navigation directions preview, the computing device comprising:
one or more processors; and
a non-transitory computer-readable memory coupled to the one or more processors and storing instructions thereon that, when executed by the one or more processors, cause the computing device to:
receive a request for navigation directions from a starting location to a destination location;
generate a set of navigation directions in response to the request, the set of navigation directions including a set of route segments on a route for traversing from the starting location to the destination location;
filter the set of route segments into a subset of the route segments for previewing the route based on a complexity level for a maneuver for each route segment in the set of route segments, the complexity level determined based on an amount of time or distance between the maneuver and a previous maneuver; and
for the filtered subset of route segments, provide previews of the subset of route segments to be displayed on a client device, the previews of the subset of route segments including panoramic street level imagery depicting the subset of route segments.

9. The computing device of claim 8, wherein to filter the subset of the route segments based on the complexity level for each route segment, the instructions cause the computing device to:
assign a score or ranking to each route segment based on the complexity level of the route segment; and
select the route segments having a score above a threshold score or ranked above a threshold ranking.

10. The computing device of claim 8, wherein the subset of the route segments is further filtered based on at least one of:
- a point of interest (POI) visible from the route segment,
- a traffic signal associated with the route segment,
- a type of maneuver for the route segment, or
- an amount of time or distance between consecutive maneuvers for consecutive route segments.

11. The computing device of claim 8, wherein the subset of the route segments is further filtered based on characteristics of a user requesting the navigation directions.

12. The computing device of claim 11, wherein the subset of the route segments is filtered by assigning a familiarity metric to each route segment according to historical route data for the user indicative of the user's familiarity with the route segment.

13. A method for providing a navigation directions preview, the method comprising:
receiving, at one or more processors, a request for navigation directions from a starting location to a destination location;
obtaining, by the one or more processors, a set of navigation directions in response to the request, the set of navigation directions including a set of route segments on a route for traversing from the starting location to the destination location;
providing, by the one or more processors, previews of a subset of the route segments including displaying video frames of panoramic street level imagery depicting an area leading up to, at, and subsequent to a waypoint location for a maneuver associated with each route segment, wherein the subset of the route segments for previewing the route is filtered based on a complexity level for a maneuver for each route segment in the set of route segments, the complexity level determined based on an amount of time or distance between the maneuver and a previous maneuver.

14. The method of claim 13, wherein providing a preview of a route segment in the subset includes providing audio describing the maneuver for the route segment, wherein the audio during the preview is different from an audio navigation instruction provided during navigation.

15. The method of claim 14, wherein the audio during the preview includes additional details not included in the audio navigation instruction provided during navigation.

16. The method of claim 13, further comprising:
obtaining, by the one or more processors, an expected date or time for traversing the set of navigation directions; and
adjusting, by the one or more processors, style parameters for the panoramic street level imagery in accordance with the expected date or time for traversing the set of navigation directions.

17. The method of claim 16, wherein adjusting style parameters for the panoramic street level imagery includes:
obtaining, by the one or more processors, estimated weather conditions for the expected date or time for traversing the set of navigation directions; and
adjusting, by the one or more processors, the panoramic street level imagery in accordance with the estimated weather conditions.

18. The method of claim 16, wherein adjusting style parameters for the panoramic street level imagery includes:
determining, by the one or more processors, that the expected date or time for traversing the set of navigation directions is at night; and
providing, by the one or more processors, a night view of the panoramic street level imagery.

* * * * *